No. 731,873. PATENTED JUNE 23, 1903.
F. G. ECHOLS.
MACHINE FOR RELIEVING FLUTED TOOLS.
APPLICATION FILED OCT. 10, 1902.
NO MODEL. 5 SHEETS—SHEET 1.

Witnesses:
Wm P. Laraway
Frances E. Blodgett

Inventor:
Francis G. Echols:
By his Attorneys:
Blodgett & Peck

No. 731,873. PATENTED JUNE 23, 1903.
F. G. ECHOLS.
MACHINE FOR RELIEVING FLUTED TOOLS.
APPLICATION FILED OCT. 10, 1902.
NO MODEL. 5 SHEETS—SHEET 3.

Witnesses:
F. G. Campbell
Francis E. Blodgett

Inventor:
Francis G. Echols:
By his Attorneys:
Blodgett & Peck

No. 731,873. PATENTED JUNE 23, 1903.
F. G. ECHOLS.
MACHINE FOR RELIEVING FLUTED TOOLS.
APPLICATION FILED OCT. 10, 1902.

NO MODEL. 5 SHEETS—SHEET 4.

Witnesses:
F. G. Campbell
Frances E. Blodgett

Inventor:
Francis G. Echols
By his Attorneys:
Blodgett & Peck

No. 731,873.

Patented June 23, 1903.

UNITED STATES PATENT OFFICE.

FRANCIS G. ECHOLS, OF HARTFORD, CONNECTICUT, ASSIGNOR TO PRATT & WHITNEY COMPANY, OF HARTFORD, CONNECTICUT, A CORPORATION OF NEW JERSEY.

MACHINE FOR RELIEVING FLUTED TOOLS.

SPECIFICATION forming part of Letters Patent No. 731,873, dated June 23, 1903.

Application filed October 10, 1902. Serial No. 126,705. (No model.)

*To all whom it may concern:*

Be it known that I, FRANCIS G. ECHOLS, a citizen of the United States, residing at Hartford, in the county of Hartford and State of Connecticut, have invented certain new and useful Improvements in Machines for Relieving Fluted Tools, of which the following is a specification.

My invention relates to machines for relieving fluted tools, such as reamers, taps, &c.; and it has for its object the provision of improved means for accomplishing this result expeditiously and with precision, whereby tools of any desired size may be accurately relieved and all products of the machine will be of standard quality.

A further object of the invention is the provision of improved means for oscillating the work in such a way that the various ribs or "lands" thereof will be brought into contact with the relieving-tool, such action taking place during a reciprocation of either the carriage or said work with relation to each other.

A further object of the invention is the provision of improved means for indexing or turning the tool step by step until all of its lands have been relieved by the grinding-disk or other instrumentality employed.

In the accompanying drawings.

Like numerals designate similar parts throughout the several views.

Referring to the drawings, the numeral 5 designates framework of any desired design and construction; 6, a carriage mounted for reciprocatory movement by any suitable means upon said framework; 7, a bed-plate adjustable in an arcuate path upon said carriage; 8, bolts passing through slotted flanges of the bed-plate; 9, a head-stock, and 10 a tail-stock, mounted for adjustment toward and from each other on the bed-plate in a well-known way.

Figure 1:
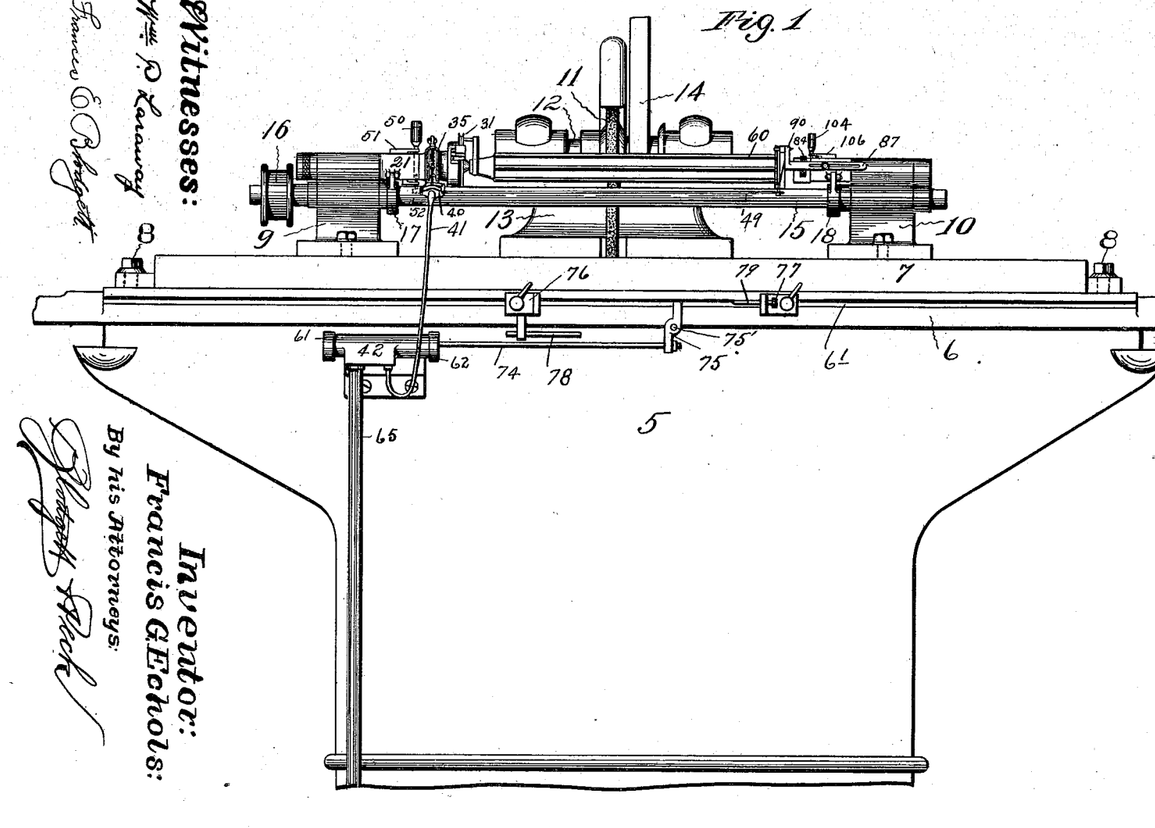
Figure 1 is a side elevation of my improved machine.

Designated by the numeral 11 is a rotary tool, shown as a grinding-disk, although other suitable tools may be substituted therefor, said tool being supported by a shaft 12, journaled in bearings of a standard 13 of the frame and driven by a belt 14, as illustrated in Fig. 1.

Mounted in bearings of the head and tail stocks is a shaft 15, carrying a pulley 16, and this shaft is shown provided with a longitudinal groove for the reception of keys, by which eccentrics 17 and 18 are connected to said shaft with a feasibility of adjustment lengthwise thereof to accord with the position of the head and tail stocks upon the bed-plate, eccentric 17 being secured to the shaft adjacent to the head-stock 9 and eccentric 18 adjacent to tail-stock 10.

Figure 2:
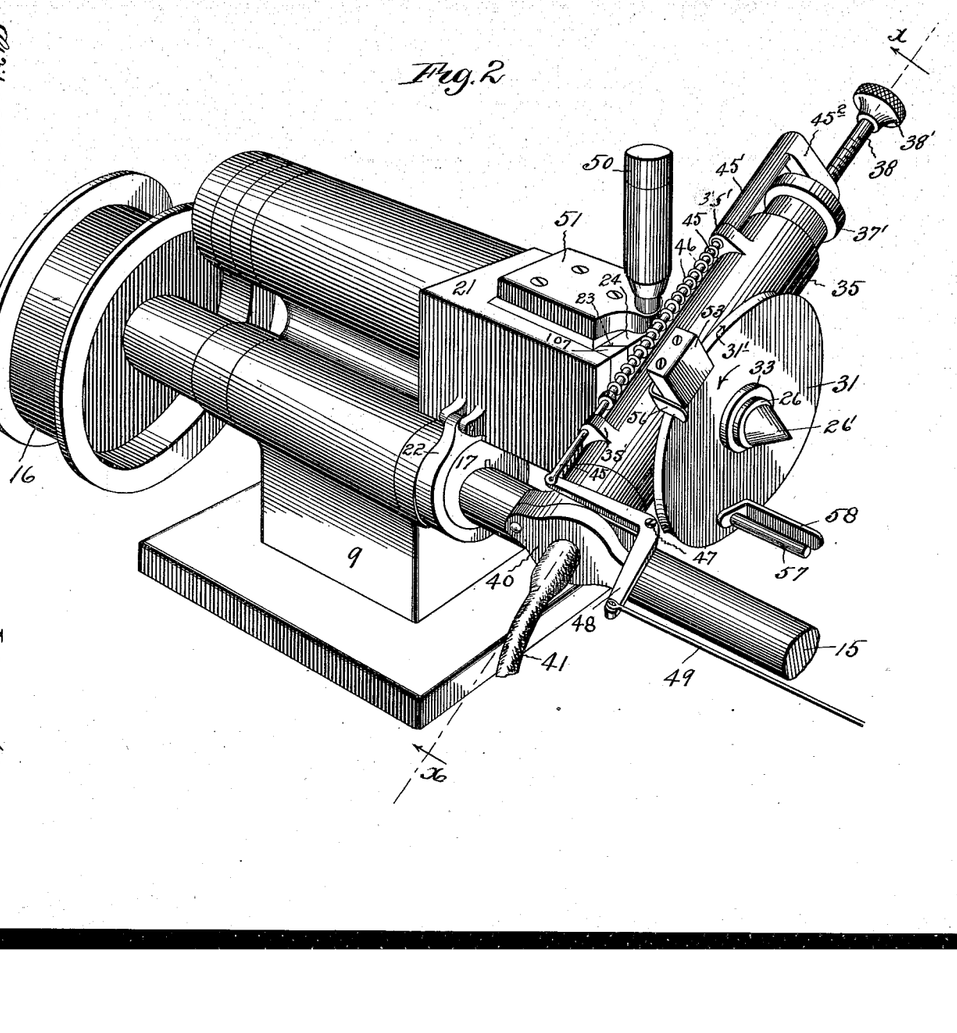
Fig. 2 is a perspective view of the head-stock and parts carried thereby.
Figures 3, 4, 5:
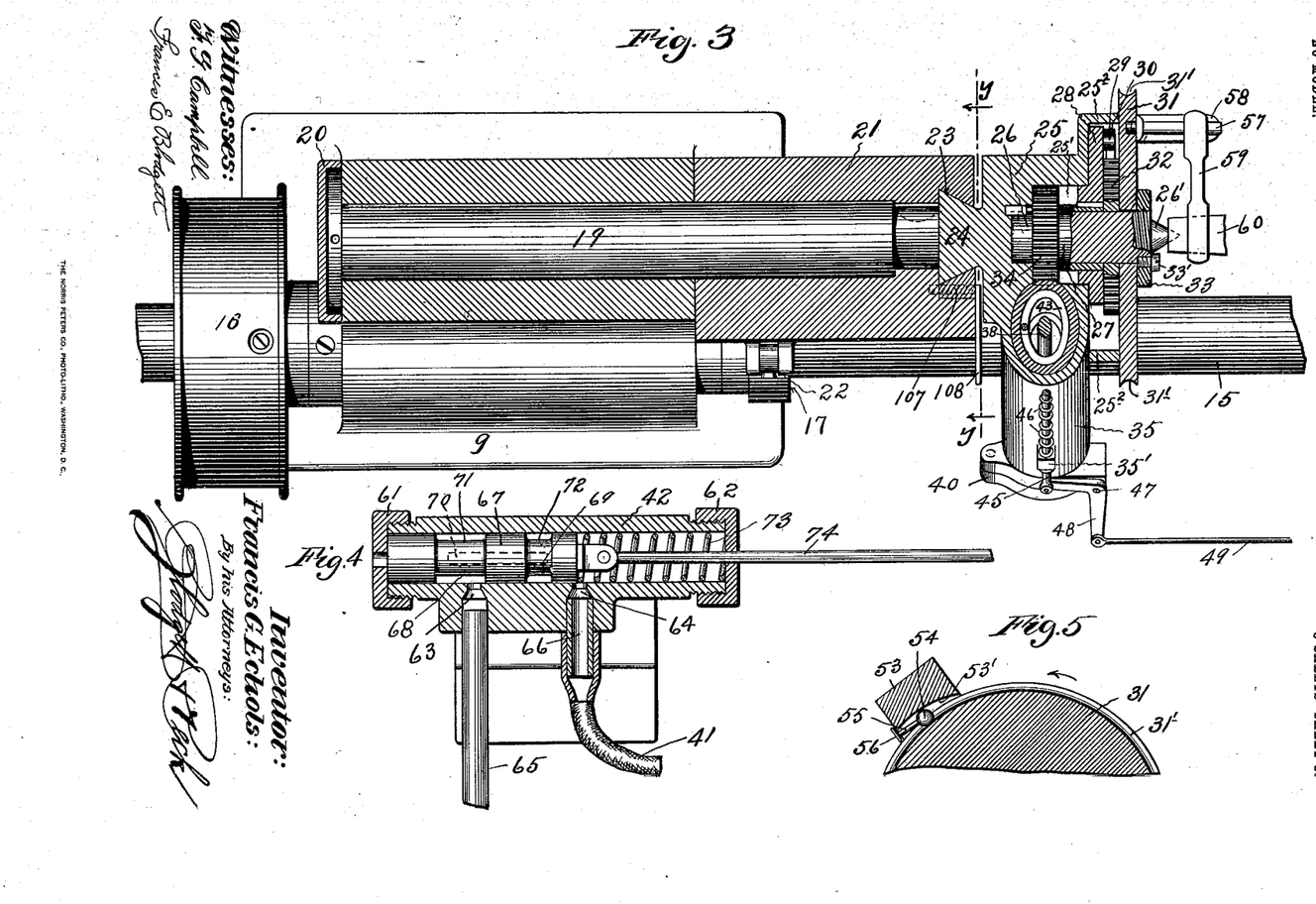
Fig. 3 is a horizontal section of the upper part of the head-stock with certain parts in elevation.
Fig. 4 is a detail in section of the valve-chamber, the valve being in elevation.
Fig. 5 is a sectional detail of the face-plate hereinafter mentioned.

Mounted in the head-stock 9 is a shaft 19, the bore in which said shaft is fitted being closed at its rear end by a cap 20, as shown in Fig. 3, and keyed or otherwise connected to the forward end of said shaft is a head 21, to which the strap 22 of eccentric 17 is articulated, as illustrated in Fig. 2. In its front end this head is provided with a guideway 23, shown as of dovetail shape, in which is fitted an extension 24 of similar form, projecting from the rear part of a head 25. Said head 25 is chambered at 25' and has a forwardly-projecting circumferential flange $25^2$. Secured to and projecting from the base of the chamber 25 is a stud or short shaft 26, shaped at its projecting end as a cone center 26', and surrounding this stud is a sleeve 27, having keyed thereto a plate 28, carrying a pawl 29, said plate and pawl being located within the flange 25² and the pawl being pressed to its work by a spring 30, as shown in Figs. 3 and 7.

Loosely mounted upon the shaft 26 is a face-plate 31, having a grooved periphery 31', and secured to or formed integral with the face-plate and located on its inner side is a ratchet-wheel 32. At its projecting end the shaft 26 is threaded just rear of the cone to receive a nut 33, which holds the face-plate in position, the nut being prevented from turning by a screw 33', threaded into the shaft and said nut, as shown in Fig. 3.

Rigid with sleeve 27 is a gear 34, and projecting from the head 25 is a casing 35, having perforated lugs 35' for a purpose hereinafter stated. Located within this casing is a piston-chamber 36, held in place by a threaded sleeve 37 at one end, said sleeve engaging a complemental thread 35² and the sleeve having a flanged head 37' with a central opening 37² for the reception of a rod 38, having a roughened head 38'. Abutting against the lower end of the piston-chamber is a flanged cap 39, having a port 39', and secured to a flanged end of the casing 35 is a plate 40, having a nozzle 40' in alinement with the port 39', said nozzle receiving the end of a flexible tube 41, leading to a valve-chamber 42. (Illustrated in Figs. 1 and 4 and hereinafter described.)

Figures 6, 7, 8:
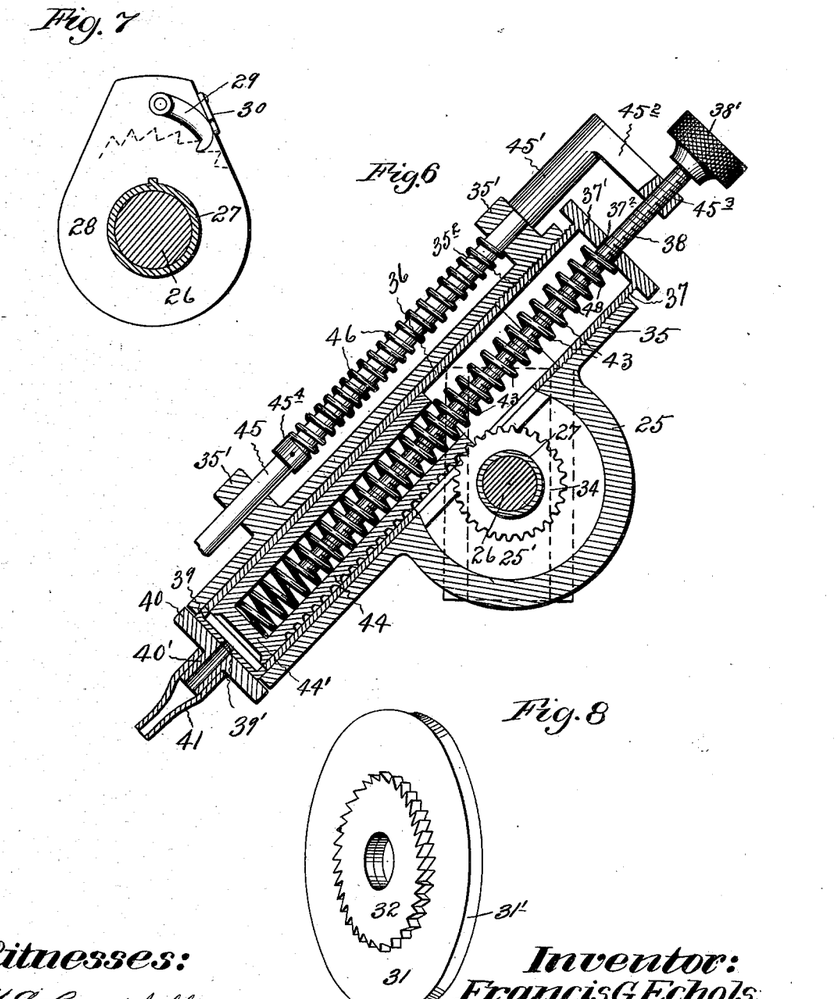
Fig. 6 is a longitudinal vertical section of the piston, piston-chamber, and adjacent parts, taken on line $x\,x$ of Fig. 2.
Fig. 7 is a sectional detail view showing the pawl and its carrier in elevation and the ratchet-wheel on the face-plate by dotted lines.
Fig. 8 is a perspective view of the rear side of the face-plate.

Surrounding the threaded rod 38 is a spiral spring 43, bearing at one end against the under side of the closed end of sleeve 37 and received at its opposite extremity and for a portion of its length in a hollow piston 44, located within the piston-chamber 36 and having a closed end 44', as illustrated in Fig. 6.

Fitted for sliding movement in the perforated lugs 35' of casing 35 is a rod 45, having an enlargement 45' with a lateral extension 45², said extension being provided with a bore 45³ for the reception of the screw 38. Surrounding the rod 45 and bearing at one end against a collar 45⁴ thereon and at the opposite end against the inner side of one of the lugs 35' is a spiral spring 46, which normally tends to throw the rod to the position shown in Fig. 6 with its enlarged head against the upper side of one of the lugs 35'. Pivoted at 47 to the flange of the casing 35 is an angle-lever 48, one of the ends of which is articulated to the rod 45 and the other end of which is connected to a long rod 49.

For adjusting and accurately determining the position of the head center 26' a vernier 50 is mounted in a plate 51, secured to the head 21, the end of said vernier being located over the top of the slide, and for adjusting this slide to the position determined by the vernier a screw 52 is mounted in a flange secured to the head beneath said slide.

Projecting from the casing is a block 53, having a concaved inner surface 53', the arc of curvature of which is eccentric to that of the grooved periphery of the face-plate 31, and located in a groove of said face-plate 31 is a ball 54, normally retained in the position represented in Fig. 5 by a pin 55, projecting from a spring 56, carried by said block 53, as illustrated in Figs. 2 and 5. With this construction the face-plate is permitted partially to rotate for indexing purposes in but one direction, that of the arrow in Fig. 5, for should by any cause an attempt be made to turn it in an opposite direction the ball will bind between the inner surface of the block and the periphery of said face-plate and will prevent such movement.

Projecting from the face-plate are a stud 57 and a spring 58 for receiving between them the arm of a lathe-dog 59, bifurcated at its opposite end to straddle the work or tool-blank 60 in a well-known manner.

Mounted on the frame is a valve-chamber 42, hereinbefore mentioned, and this valve-chamber is closed at its ends by threaded and perforated caps 61 and 62, respectively, and is provided with an admission-port 63 and with an eduction-port 64. Fitted within an opening leading to the admission-port is a conduit 65, leading to a suitable source of fluid-pressure (not shown)—for instance, a compressed-air tank. Mounted in an opening communicating with the eduction-port 64 is a nipple 66, over which the end of the flexible tube 41 is fitted, as represented in said Fig. 4.

Mounted within the valve-chamber 42 is a reciprocatory valve 67, having ports 68 and 69, respectively, communicating with a longitudinal passage 70 in said valve, the body of the valve being reduced at 71 and 72, respectively, to enable communication to be made between the induction and eduction ports when the valve is shifted longitudinally of the chamber by means hereinafter described. A spring 73 is fitted in the valve-chamber and normally tends to throw the valve to its closed position. (Illustrated in the figure mentioned.) Connected to the right-hand end of the valve is a rod 74, which passes through the perforated cap 62 and is attached by a nut or otherwise at its free end to a lever 75, pivoted at 75' to the bed or frame 5.

In one of its sides the reciprocatory carriage 6 is provided with a longitudinal groove 6', in which are adjustably fitted stop-carriers 76 and 77, respectively, provided with adjustable stops 78 and 79, respectively, the stop 78 coming into contact with lever 75 below its pivot upon one reciprocation of the carriage, and thereby shifting the valve to admit fluid to the pipe 41, and the stop 79 likewise contacting with said lever above its pivot when the carriage reciprocates in an opposite direction to again shift the valve in the same way to admit fluid to said pipe 41. This valve-chamber, the valve, adjustable stops, and pivoted lever are fully set forth and described in my contemporaneously-pending applications filed August 25, 1902, Serial Nos. 120,953 and 120,954, and no claim is made to said features in the present application.

Journaled in the tail-stock 10 is a shaft 80, having a head 81, provided with a groove for the reception of a slide 82, bifurcated at 83 for the reception of a nut 84 for adjusting a sleeve 85, in which is fitted a "pump-center" 86 for sustaining the rear end of the tool-blank, all as set forth in my application, Serial No. 120,953, above mentioned.

Figures 9, 10:
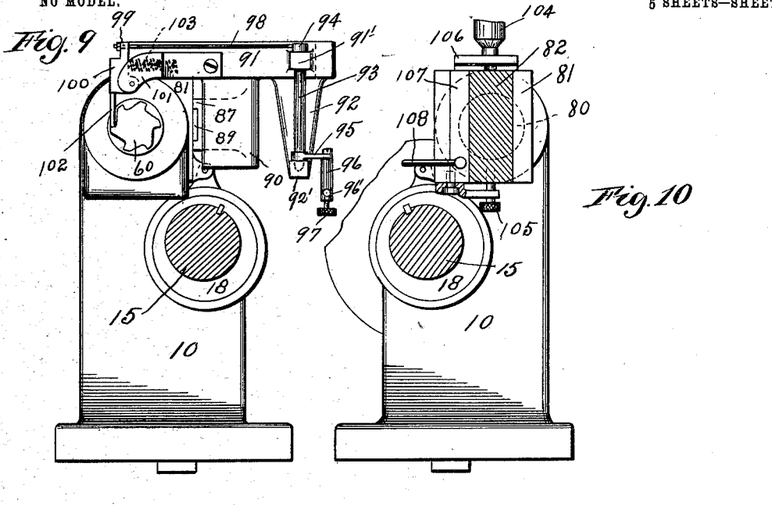
Fig. 9 is a front end elevation of the tail-stock with the shaft carrying the eccentrics in section.
Fig. 10 is a transverse section on line $y\,y$ of Fig. 3 looking in the direction of the arrow.
Figures 11, 12:
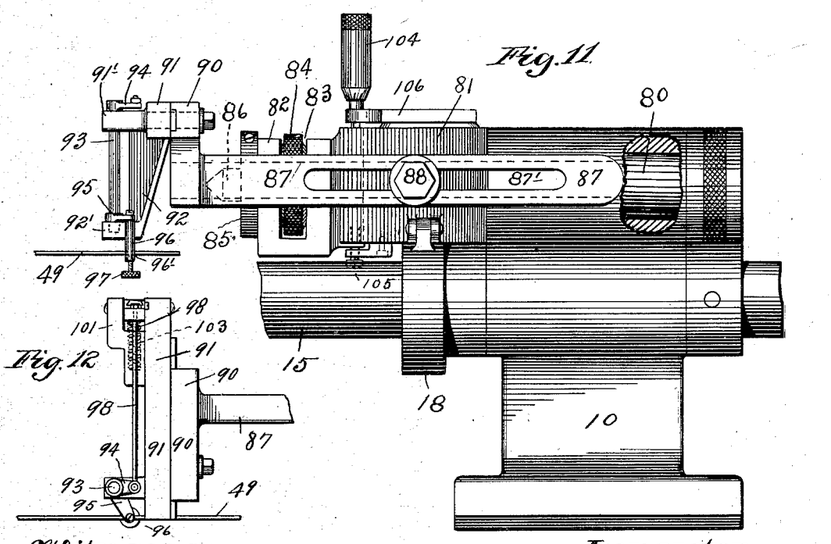
Fig. 11 is a side elevation of the tail-stock and its attached parts.
Fig. 12 is a detail view in elevation of part of the means for actuating the pawl for preventing over indexing of the work.

Designated by 87 is a bar having a longitudinal slot 87', said bar being secured to the head 81 by a screw-bolt 88, this bar being grooved at 89, as shown by dotted lines in Fig. 11 and by full lines in Fig. 9, so that its frictional engagement with the head will be reduced. At the forward end of this bar is a head 90, to which is secured by bolts or otherwise a plate 91, having a perforated lug 91', and a depending extension 92, provided with a lug 92'. Fitted in a socket of this lug and passing through the lug 91' is a rock-shaft 93, having crank-arms 94 95, and depending from the arm 95, to which it is secured by a screw or otherwise, is a stud 96, perforated at 96' to receive the rod 49, the latter being secured in the perforation 96' by a screw 97. Articulated to the crank-arm 95 is a rod 98, connected at 99 to a lever 100, pivoted to a bracket 101 and carrying a yielding stop-plate or pawl 102, which is normally thrown to the position represented in Fig. 9 by a spring 103.

For adjusting the slide 82, carrying the center 86, a vernier 104 and screw 105 are employed, said devices being duplicates of those for accomplishing a like purpose with the slide 24, carrying the head-center 26', said vernier being mounted in a plate 106, secured to head 81. To secure the slides 24 and 82 against liability of displacement after they have been adjusted, gibs 107, secured by lever-screws 108, may be employed, if desired, as shown in Figs. 3 and 10.

My improved machine operates as follows: Slides 24 and 82 are first set to adjust the centers to the exact position required and determined by the scales of the verniers, and the tool supported by said centers is thereby brought to the location necessary for the relieving operation to take place. Power is now applied to pulley 16 of shaft 15, thereby through eccentrics 17 and 18 rocking the heads 21 and 81 and causing the tool-blank 60 to be brought alternately in and out of contact with the edge of the grinding-disk 11 or other relieving-tool employed. Carriage 6 may be reciprocated by any desired means (not shown)—for instance, by the mechanism fully set forth in my application Serial No. 120,953, above mentioned—and the tool-blank is given a longitudinal traverse along the edge of the grinding-disk, the rocking motion of the blank toward the edge of the disk 11 being continuous until all of the lands are relieved by said disk. As the carriage arrives at the limit of its movement toward the left the stop 79 will strike lever 75 above its pivot, thereby causing the rod 74, connected to said lever, to open the valve 67 and permit an inrush of air to flexible pipe 41 and piston-chamber 36, thereby advancing the piston 44 and causing the rack-teeth thereof to turn the gear 34, the sleeve to which it is attached, and the pawl-carrying plate 28, thereby shifting the pawl 29 over the ratchet 32 of face-plate 31. As the piston 44 reciprocates in its chamber spring 43 is compressed, and the closed end of said piston finally comes into contact with the end of rod 38, thereby shifting said rod and causing it to reciprocate the rod 45, connected to bell-crank lever 48, and this lever as it rocks causes the rod 49 to actuate the rock-shaft 93 and through the connections described to oscillate the pivoted lever 100 and momentarily withdraw the pawl 102 from contact with the blank. As the carriage starts on its reciprocation toward the right the valve is immediately closed by spring 73, thus shutting off the supply of motive fluid to the flexible tube 41, and when this has been accomplished the piston 44 is immediately forced to its normal position, (shown in Fig. 6,) thereby rocking the sleeve 27 and plate 28 in an opposite direction and causing the pawl 29, in engagement with the ratchet-wheel 32, to turn the face-plate 31 and index the work. As the piston 44 is forced to its lower position the rod 45 is simultaneously actuated by spring 36. The bell-crank 48 is swung back again, and this action permits the pawl to snap upon the back of the tooth or land just relieved and to engage the next tooth, and thus prevent the blank from turning too far under the influence of the indexing mechanism. At the limit of the reciprocation of carriage 6 toward the right another land is relieved, and the stop 78 will strike lever 75 below its pivot, and thus cause the valve to be actuated and the indexing devices to operate in the manner above described. In this way upon each movement of the carriage a land of the tool-blank will be relieved. The blank will then be indexed and another land relieved upon the return reciprocation of the carriage, and so on until all the lands are finished, when the blank will be removed, a new one inserted, and the operation repeated.

By adjusting the bar 87 the pawl 102 may be located at any desired point along the line of the tool-blank, and the head and tail stocks may also be adjusted upon the bed-plate 7 to set the centers for different lengths of blanks.

My invention is not limited to the precise details of construction shown and described, nor to their present location and arrangement; nor is it limited to the means shown and described for actuating the pawl or dog for preventing over-indexing of the blank.

Furthermore, the indexing mechanism may be employed with machines of a different character without departure from the invention.

Having thus described my invention, what I claim is—

1. The combination, with a reciprocatory carriage, of means for supporting work thereon, and means actuated by fluid-pressure in one direction and by spring-pressure in the opposite direction for indexing the work.

2. The combination, with a reciprocatory carriage, of head and tail stocks movable with said carriage; and means actuated by fluid-pressure in one direction and by spring-pressure for indexing purposes in the opposite direction.

3. The combination, with a reciprocatory carriage, of adjustable head and tail stocks; centers for supporting work carried by said stocks; indexing mechanism; spring-controlled devices for actuating said indexing mechanism in a direction for indexing the work; and fluid-pressure devices for actuating it in the opposite direction.

4. The combination, with means for supporting work, of a piston-chamber; a piston in said chamber; means for supplying fluid under pressure to said piston-chamber; a rack carried by the piston; means for returning the piston after the supply of fluid has been shut off; and means actuated by the rack for indexing the work.

5. The combination, with a reciprocatory carriage, of head and tail stocks; shafts mounted for oscillatory movement in said stocks; heads carried by the shafts; centers upon which work is supported mounted in the heads; a sleeve mounted in a chamber of one of the heads; means for oscillating the sleeve; and means controlled by the sleeve for indexing the work.

6. The combination, with a support, of a stationary shaft; a sleeve upon said shaft; means for actuating the sleeve; and means controlled by the sleeve for indexing the work.

7. The combination, with a chambered support, of a stationary shaft located in the chamber of said support; a sleeve surrounding said shaft; means for actuating the sleeve; and means controlled by the sleeve for indexing work.

8. The combination, with a support, of a shaft fixed thereto; a geared sleeve loose on said shaft; means for oscillating the sleeve; and means controlled by the sleeve for indexing work.

9. The combination, with a device for supporting work, of a chambered head; a shaft constituting one of the work-supporting devices mounted in said head; a sleeve surrounding said shaft; a gear on said sleeve; a rack in engagement with the gear; means for actuating the rack; and indexing mechanism controlled by the sleeve.

10. The combination, with work-supporting devices, of a chambered head; a shaft constituting one of said work-supporting devices keyed in said head; a sleeve loose on the shaft; a gear on the sleeve; a plate also carried by the sleeve; a pawl carried by the plate; a face-plate loose on the shaft; a ratchet-wheel rigid with the face-plate, and with which the pawl is in engagement; and means carried by the face-plate for engaging work.

11. The combination, with work-supporting devices, of a chambered support having an extension; a shaft constituting one of the work-supporting devices and mounted in the support; a sleeve loose on the shaft; a gear carried by the sleeve; a plate also carried by the sleeve; a pawl connected to the plate; a rack mounted on the extension of the support and in engagement with the gear on the sleeve; means for actuating the rack; a face-plate loose on the shaft; a ratchet-wheel carried by the face-plate; and means for connecting the face-plate with the work.

12. The combination, with work-supporting devices, of indexing mechanism; and a device for engaging and thereby preventing over-indexing of the work controlled by a part of said indexing mechanism.

13. The combination, with devices for supporting work, of a movable device for engaging said work and preventing over-indexing of said work; and means for connecting said device with an element of the indexing mechanism.

14. The combination, with work-supporting devices, of a pivoted dog for engaging said work and preventing over-indexing of the same; indexing mechanism; and means controlled by an element of said indexing mechanism for actuating said dog.

15. The combination, with work-supporting devices, of indexing mechanism; devices actuated by fluid-pressure for operating certain elements of said indexing mechanism in one direction; devices actuated by spring-pressure for operating them in the opposite direction; means for connecting the elements actuated in the manner set forth with the work; a device for preventing over-indexing of the work; and means for actuating said device.

16. The combination, with work-supporting devices, of a chambered head; a shaft projecting from said head, and having a center; a lathe-dog, and means for connecting it with the face-plate; a ratchet-wheel rigid with the face-plate; a sleeve loosely mounted on the shaft; a gear rigid with the sleeve; a plate keyed to the sleeve; a pawl carried by the plate, and in engagement with the ratchet-wheel; a rack mounted in an extension of the head; and means for reciprocating the rack.

17. The combination, with a chambered head, of a shaft projecting from said head; a sleeve loose on the shaft; a gear rigid with the sleeve; a plate keyed to the sleeve; a pawl carried by the plate; a face-plate loose on the shaft; a ratchet-wheel carried by the face-plate; a casing projecting from the head, and having a piston-chamber; a piston in said chamber; means for admitting fluid under pressure to said piston-chamber; a spring for returning the piston; and a rack carried by the piston and in engagement with the gear on the sleeve.

18. The combination, with means for supporting toothed work, of indexing mechanism; and a movable device controlled by an element of said indexing mechanism, said device engaging the teeth of the work and preventing over-indexing of the same.

19. The combination, with means for supporting work, of indexing mechanism; a pivoted lever having a dog for engaging the work and preventing over-indexing of the same; and means controlled by the indexing mechanism for actuating said lever.

20. The combination, with means for supporting toothed work, of indexing mechanism; a movable stop for successively engaging the teeth of the work; and means for withdrawing said stop to permit the work to be indexed, and then returning it so that it will engage a tooth and thus prevent over-indexing.

21. The combination, with head and tail stocks, of centers carried by said stocks and upon which the work is supported; indexing mechanism; a device for preventing over-indexing of the work; and means for actuating said device.

22. The combination, with head and tail stocks, of work-supporting centers carried by said head and tail stocks; a face-plate mounted on one of said stocks; means for connecting the face-plate with the work; means for turning said face-plate to index the work; and devices controlled by the means for turning the face-plate, for preventing over-indexing of said face-plate.

23. The combination, with a reciprocatory carriage, of head and tail stocks; work-supporting centers carried by said stocks; a face-plate loosely mounted on one of the centers; mechanism for indexing the face-plate; a device for preventing over-indexing of the work; and means controlled by the indexing mechanism for actuating said device.

24. The combination, with head and tail stocks, of work-supporting centers carried by said stocks; a face-plate loosely mounted on one of the centers; means for connecting said face-plate with the work; pawl mechanism for actuating the face-plate; means for actuating the pawl mechanism; a device for preventing over-indexing of the work; and connections from said device to an element of the means for actuating the pawl mechanism.

25. The combination, with a head-stock, of a center carried by said stock; a face-plate loosely mounted on the center; pawl-and-ratchet mechanism for actuating said face-plate; a rack; means for actuating the rack; gearing connecting the pawl-and-ratchet mechanism and rack; and means for connecting the face-plate with work to be indexed.

26. The combination, with a face-plate, of means for turning the same in one direction; and means comprising a ball and a device against which it bears for preventing reverse movement of said face-plate.

27. The combination, with a face-plate, of means for intermittingly rotating said face-plate; a concave block; and a ball between said block and face-plate.

28. The combination, with a face-plate having a grooved periphery, of a ball running in the groove; a stationary concave block; means for preventing the escape of the ball; and means for intermittingly rotating the face-plate.

29. The combination, with a face-plate having a grooved periphery, of means for intermittingly rotating said face-plate; a stationary, concave block; a ball between the block and face-plate; and a spring-controlled pin for preventing escape of the ball.

30. The combination, with a face-plate having a grooved periphery, of means for intermittingly rotating said face-plate; a stationary block having a concave face the arc of which is eccentric to the periphery of the face-plate; a ball between said block and face-plate; and means for preventing escape of the ball.

31. The combination, with indexing mechanism, of a face-plate having a grooved periphery; a stationary block having a concave face struck on an arc different from that of the face-plate; a ball located in the groove of the face-plate; and a spring-controlled pin for preventing escape of the ball.

32. The combination, with indexing mechanism, of a face-plate having a grooved periphery; a stationary block having a concave face eccentric to the periphery of the face-plate; a ball located between the face-plate and block; a pin; and a spring secured to the block and carrying said pin.

33. The combination, with a shaft, of a head secured to said shaft; a carrier adjustably fitted in one end of the head; a center carried by said carrier; a sleeve loosely mounted on the center; a plate keyed to the sleeve; a face-plate loose on the center; a ratchet-wheel carried by said face-plate; a pawl adapted to engage the teeth of said ratchet-wheel, and carried by the plate keyed to the sleeve; a gear on the sleeve; a rack for actuating said gear; a spring for actuating said rack in one direction; and means operated by fluid-pressure for operating the rack in an opposite direction.

34. The combination, with a chambered carrier, of a center located therein; a sleeve loose on the center; a gear carried by the sleeve; a plate keyed to the sleeve; a face-plate also loose on the center; a ratchet-wheel mounted on the face-plate; a pawl carried by the plate; a piston movable in an extension of the carrier; means for actuating said piston in one direction by fluid-pressure; and a spring for returning the piston.

35. The combination, with a chambered carrier having an extension, of a center mounted in the chamber of said carrier; a sleeve loose on the center; a gear carried by the sleeve; a plate keyed to the sleeve; a pawl carried by said plate; a face-plate loose on the center; a ratchet-wheel carried by the face-plate; a hollow piston mounted in the extension of the carrier; a piston-chamber; means for supplying fluid under pressure to said piston-chamber; and a spring bearing against the head of the piston-chamber and the piston.

36. The combination, with a carrier, of indexing mechanism supported on said carrier; a sleeve constituting a part of said indexing mechanism; a gear carried by the sleeve; a rack mounted in an extension of the carrier, and the teeth of which are in engagement with said gear; a piston-chamber; a piston in said chamber; means for supplying fluid under pressure to the piston-chamber; a device for preventing over-indexing of the work; and means controlled by the piston for actuating said device.

37. The combination, with indexing mechanism, of a carrier for said mechanism having an extension; a piston-chamber located in the extension; a piston within the piston-chamber; a rod movably mounted on the extension; means intermediate the piston and said rod, whereby the rod is actuated by said piston; a device for preventing over-indexing of the work; and means connecting the rod and said device.

38. The combination, with means for supporting work, of indexing mechanism; means for actuating said mechanism; a pivoted lever; devices for connecting said lever with an element of the means for actuating the indexing mechanism; a movably-mounted device for preventing over-indexing of the work; and means controlled by the pivoted lever for actuating said device.

39. The combination, with means for supporting work, of indexing mechanism; a piston-chamber; a piston in said chamber; means for supplying fluid under pressure to the piston-chamber; a spring for returning the piston; a rack carried by the piston; a threaded rod; a device connected to said rod; a pivoted lever; a rod actuated by said lever; a pivoted device for preventing over-indexing of the work; and means connecting the rod actuated by the pivoted lever with said device.

40. The combination, with head and tail stocks, of shafts mounted therein; means for simultaneously oscillating said shafts; heads carried by each of the shafts; slides mounted in guideways of the heads; means for adjusting the slides; centers carried by the slides; a face-plate loosely mounted on the head-stock center; means for indexing the face-plate; a device carried by the tail-stock for preventing over-indexing of the work; and means controlled by an element of the indexing means for actuating said device.

41. In a machine for relieving fluted tools, the combination, with a reciprocatory carriage, of head and tail stocks movable with said carriage; a rotary shaft journaled in said stocks; eccentrics carried by said shaft and located outside of the head and tail stocks; shafts mounted in the head and tail stocks; eccentric-straps connected to said shafts; heads carried by the shafts; work-supporting devices carried by said heads; and means for indexing the work mounted on one of the heads.

In testimony whereof I affix my signature in presence of two witnesses.

FRANCIS G. ECHOLS.

Witnesses:
E. D. CLARK,
W. W. LARKUM.